(12) United States Patent
McNew et al.

(10) Patent No.: US 9,827,811 B1
(45) Date of Patent: Nov. 28, 2017

(54) VEHICULAR HAPTIC FEEDBACK SYSTEM AND METHOD

(71) Applicant: TOYOTA MOTOR ENGINEERING & MANUFACTURING NORTH AMERICA, INC., Erlanger, KY (US)

(72) Inventors: John-Michael McNew, Ann Arbor, MI (US); Danil V. Prokhorov, Canton, MI (US); Heishiro Toyoda, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/210,375

(22) Filed: Jul. 14, 2016

(51) Int. Cl.
*B60Q 1/00* (2006.01)
*B60C 9/00* (2006.01)
*B60N 2/44* (2006.01)
*G08B 6/00* (2006.01)

(52) U.S. Cl.
CPC ............ *B60C 9/00* (2013.01); *B60N 2/44* (2013.01); *G08B 6/00* (2013.01); *B60N 2002/4485* (2013.01)

(58) Field of Classification Search
CPC .... B60Q 9/00; B60N 2/44; B60N 2002/4485; G08B 6/00
USPC ........................................... 340/438
See application file for complete search history.

(56) References Cited

U.S. PATENT DOCUMENTS

| 7,619,505 B2 | 11/2009 | Kim |
| 7,636,034 B2 | 12/2009 | Hijikata et al. |
| 7,675,432 B2 | 3/2010 | Leicht |
| 7,681,949 B2 | 3/2010 | Nathan et al. |
| 7,714,701 B2 | 5/2010 | Altan et al. |
| 9,384,645 B1 * | 7/2016 | Allen ............ G08B 3/10 |
| 2006/0235615 A1 | 10/2006 | Kato et al. |
| 2007/0276581 A1 * | 11/2007 | Bae ............ G08G 1/16 701/117 |

(Continued)

FOREIGN PATENT DOCUMENTS

| JP | 2000-225877 A | 8/2000 |
| JP | 2015-141052 | 8/2015 |

(Continued)

*Primary Examiner* — Naomi Small
(74) *Attorney, Agent, or Firm* — Oblon, McClelland, Maier & Neustadt, L.L.P.

(57) ABSTRACT

A vehicular haptic feedback system includes a haptic feedback controller configured to communicate with a vehicle. The haptic feedback controller including a plurality of haptic feedback actuators and processing circuitry configured to detect quality of operation information of the vehicle, a direction and an intensity of threat information corresponding to the vehicle, and a mode of operation of the vehicle. The haptic feedback controller is also configured to determine a desired direction of travel of the vehicle based on the quality of operation information, the direction and the intensity of threat information, and the mode of operation. The haptic feedback controller is further configured to provide haptic feedback corresponding to the quality of operation information, the direction and the intensity of threat information, the mode of operation and the desired direction of travel of the vehicle, via the plurality of haptic feedback actuators.

18 Claims, 11 Drawing Sheets

(56) References Cited

U.S. PATENT DOCUMENTS

| | | | |
|---|---|---|---|
| 2011/0190972 A1* | 8/2011 | Timmons | G01C 21/34 701/31.4 |
| 2013/0342339 A1* | 12/2013 | Kiefer | G08B 6/00 340/438 |
| 2014/0346823 A1* | 11/2014 | Stebbins | B60Q 9/008 297/217.1 |
| 2015/0100189 A1* | 4/2015 | Tellis | B60T 7/18 701/23 |
| 2015/0127208 A1* | 5/2015 | Jecker | B62D 15/025 701/23 |
| 2015/0149088 A1* | 5/2015 | Attard | G01C 21/36 701/538 |
| 2015/0161913 A1 | 6/2015 | Dominguez et al. | |
| 2015/0203030 A1 | 7/2015 | Knobl et al. | |
| 2015/0211870 A1* | 7/2015 | Nickolaou | G01C 21/34 701/28 |
| 2015/0277559 A1 | 10/2015 | Vescovi et al. | |
| 2016/0016585 A1* | 1/2016 | Park | B60W 30/12 701/41 |
| 2016/0207454 A1* | 7/2016 | Cuddihy | G08B 6/00 |
| 2016/0298976 A1 | 10/2016 | Sato et al. | |
| 2016/0313733 A1* | 10/2016 | Bellem | B60W 50/14 |
| 2016/0318490 A1* | 11/2016 | Ben Shalom | B60T 7/12 |
| 2016/0358477 A1* | 12/2016 | Ansari | G08G 1/167 |
| 2016/0375900 A1* | 12/2016 | Laur | B60W 30/09 701/41 |

FOREIGN PATENT DOCUMENTS

| | | |
|---|---|---|
| JP | 2015-141054 | 8/2015 |
| JP | 2015-141478 | 8/2015 |
| JP | 2015-158467 | 9/2015 |
| JP | 2015-158469 | 9/2015 |
| JP | 2015-182624 | 10/2015 |
| WO | WO 2015/129366 A1 | 9/2015 |
| WO | WO 2015-162784 A1 | 10/2015 |

* cited by examiner

VEHICULAR HAPTIC FEEDBACK SYSTEM AND METHOD

BACKGROUND

The "background" description provided herein is for the purpose of generally presenting the context of the disclosure. Work of the presently named inventor, to the extent it is described in this background section, as well as aspects of the description which may not otherwise qualify as conventional art at the time of filing, are neither expressly nor impliedly admitted as conventional art against the present disclosure.

Various types of feedback are offered to operators of vehicles. The feedback can be utilized to convey information to the driver and can include visual feedback, audial feedback, and haptic feedback. Currently, a feedback system can be integrated into a vehicle in which the feedback system detects information corresponding to the safe operation of the vehicle. For example, a system can utilize the detected information to determine countermeasures to avoid dangerous situations. Additionally, systems can provide feedback to stimulate awareness of the driver such that the driver becomes cognoscente of potentially hazardous situations.

The present feedback systems in vehicles are configured to provide notifications to the driver to indicate driving conditions, road structure, hazardous threats, and navigational information. Such notifications provide the driver with discrete feedback that assists the driver with the operation of the vehicle. However, the discrete feedback does not enable the driver to dynamically monitor the vehicle's quality of operation information, the vehicle's mode of operation information, and threat detection information.

SUMMARY

In an exemplary aspect, a vehicular haptic feedback system includes a haptic feedback controller configured to communicate with a vehicle. The haptic feedback controller includes a plurality of haptic feedback actuators and processing circuitry configured to detect via data received from one or more sensors, quality of operation information of the vehicle, a direction and an intensity of threat information corresponding to the vehicle, and a mode of operation of the vehicle. The haptic feedback controller is also configured to determine via the data received from the one or more sensors, a desired direction of travel of the vehicle based on the quality of operation information, the direction and the intensity of threat information, and the mode of operation. The haptic feedback controller may instead be configured to provide haptic feedback corresponding to the quality of operation information, the direction and the intensity of threat information, the mode of operation, and the desired direction of travel of the vehicle, via the plurality of haptic feedback actuators.

The foregoing general description of implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
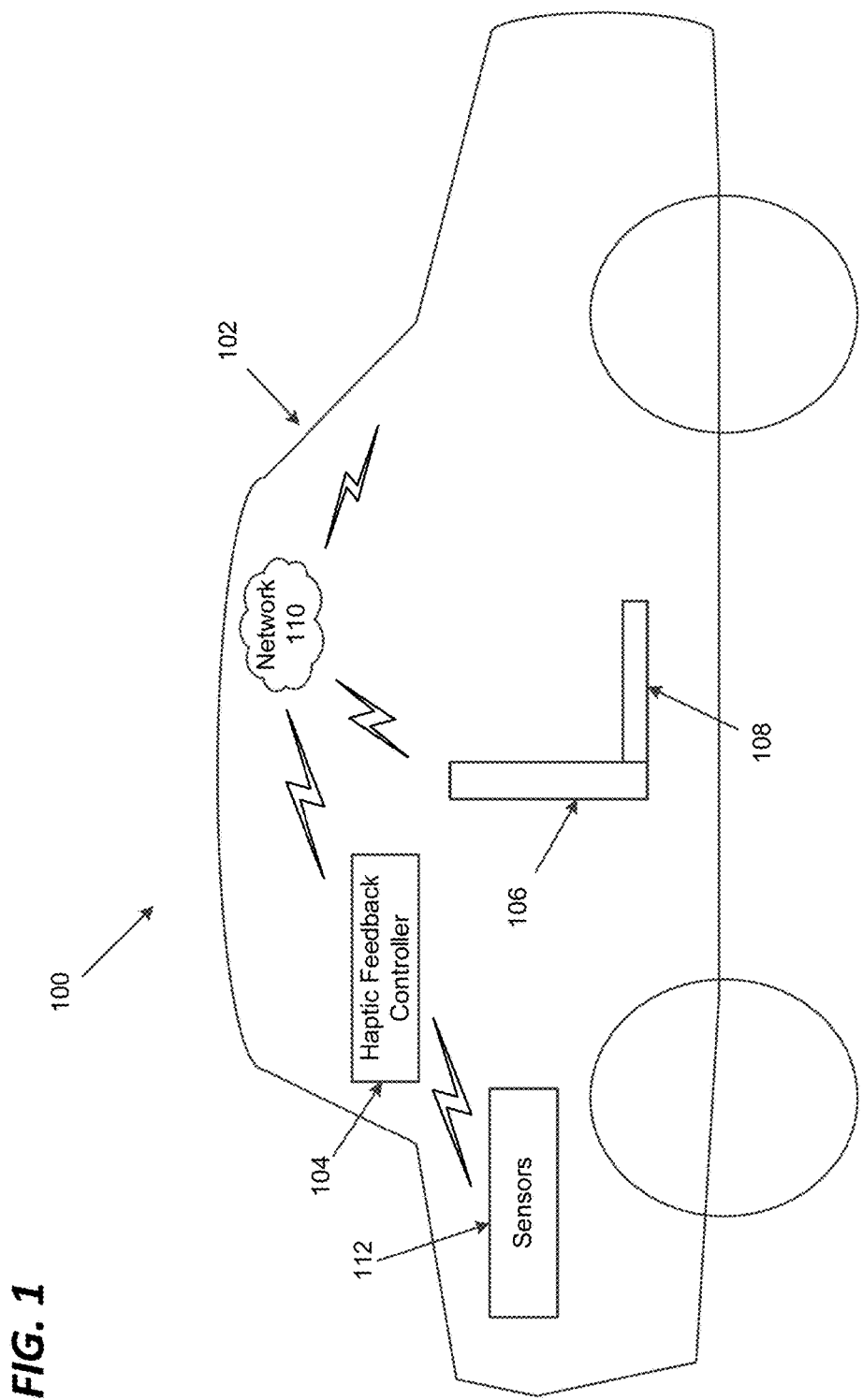
FIG. 1 is an exemplary illustration of a vehicular haptic feedback system, according to certain aspects.

In the drawings, like reference numerals designate identical or corresponding parts throughout the several views. Further, as used herein, the words "a," "an," and "the" generally carry a meaning of "one or more," unless stated otherwise.

FIG. 1 is an exemplary illustration of a vehicular haptic feedback system 100, according to certain aspects. The vehicular haptic feedback system 100 includes a vehicle 102, a haptic feedback controller 104, a seat including a seat back 106 and a seat base 108, and a network 110. The vehicular haptic feedback system 100 is configured to utilize spatio-temporal haptic feedback in the vehicle 102 to provide a driver of the vehicle 102 with quality of operation information, threat information, and mode of operation information.

The vehicle 102 is in communication with the haptic feedback controller 104 and the seat via the network 110. The vehicle 102 can include an automobile, a truck, a van, a sport utility vehicle, an autonomous automobile, an autonomous truck, an autonomous van, an autonomous sport utility vehicle, and the like. The vehicle 102 can be utilized by processing circuitry of the haptic feedback controller 104 to determine orientation and location. As such, the vehicle 102 can provide the haptic feedback controller 104 with information that enables efficient and accurate threat detection. Additionally, the vehicle 102 can be configured to detect road structure that the vehicle 102 is navigating. The vehicle 102 can be utilized by the processing circuitry of the haptic feedback controller 104 to determine quality of operation information and a desired direction of travel of the vehicle 102.

The haptic feedback controller 104 is in communication with the vehicle 102 and the seat via the network 110. The haptic feedback controller 104 includes processing circuitry configured to utilize haptic feedback to provide the driver of the vehicle 102 with quality of operation information of the vehicle 102, direction and intensity of threat information of the vehicle 102, and mode of operation information of the vehicle 102. In certain aspects of the present disclosure, the haptic feedback controller 104 is located at the seat of the vehicle 102. The haptic feedback controller 104 can be located in the seat back 106 of the seat, the seat base 108 of the seat, or both. In other aspects, the haptic feedback controller 104 can be located at an external device such as a glove, a shoe insert, a pedal, a foot rest, a floor mat, a steering wheel, and the like. As such, the haptic feedback controller 104 is configured to relay information to the driver in the form of haptic feedback so that the driver may be provided with persistent, situational awareness.

In some aspects, the processing circuitry of the haptic feedback controller 104 provides haptic feedback via feedback actuators, such as piezoelectric haptic devices located in the seat, the external device, and the like. The circuitry can be configured to provide haptic feedback in a plurality of patterns. The plurality of patterns can include a plurality of parameters that correspond to automated levels of the vehicle, levels of threat intensity, level of quality of operation information, and the like. Further, the parameters corresponding to the patterns can include pattern type, starting point of a pattern, ending point of a pattern, speed (i.e., firing rate) of a pattern, directionality of a pattern, and the like.

The haptic feedback controller 104 can be in communication with autonomous vehicles as well as non-autonomous vehicles. The circuitry of the haptic feedback controller 104 is configured to provide feedback to the driver of the vehicle 102 to ultimately indicate the current mode or status of the vehicle 102. The haptic feedback provided by the circuitry provides persistent feedback to the driver due to the subtle nature of the haptic feedback patterns. In certain aspects, in which the vehicle 102 is an autonomous vehicle, the circuitry can be configured to provide the driver with information via haptic feedback in situations where the driver may want to resume manual control over the vehicle 102. In this instance, the driver can be given the option to resume manual control over the vehicle 102 entirely, or to a certain degree corresponding to a predetermined level of mode of operation. The levels of mode of operation will be discussed further herein.

The seat is located in the vehicle 102 and can be utilized to provide haptic feedback to the user, via haptic feedback actuators of the haptic feedback controller 104. In some aspects, the haptic feedback controller 104 is located in the seat back 106, the seat base 108, or both. In other aspects, the haptic feedback controller 104 is in communication with the seat, but is located externally from the seat. In this instance, the processing circuitry may transmit information to haptic feedback actuators located in the seat to provide the driver with quality of operation information, threat information, and mode of operation information.

The network 110 represents one or more networks 110, and is connected to the vehicle 102 and the haptic feedback controller 104. The haptic feedback controller 104 is also attached via the network 110 to a group of sensors 112 that record measurements of the surrounding environment of the vehicle 102. The group of sensors 112 includes, but is not limited to mono and stereo cameras, lidar detectors, radar detectors, ultrasonic sensors, microphones, and touch sensors. The haptic feedback controller 104 utilizes data converted and received from the group of sensors 112 to determine a closing speed, a distance to a threat, and the like.

The network 110 can communicate via wired networks such as Ethernet, LAN, or any other wired form of communication that is known. The network 110 can also communicate via wireless networks such as Wi-Fi, BLUETOOTH, cellular networks including EDGE, 3G and 4G wireless cellular systems, infrared, or any other wireless form of communication that is known.

Figure 2:
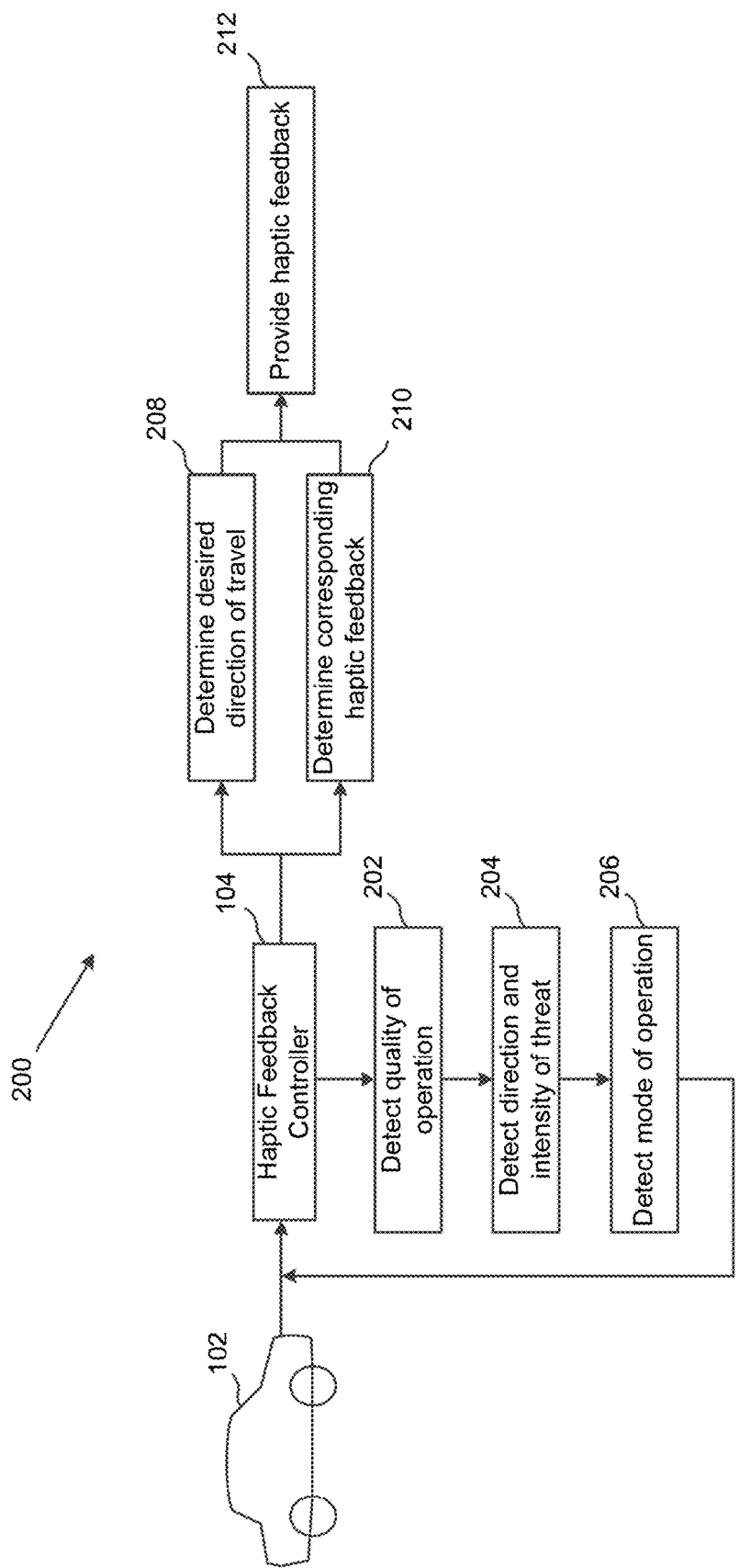
FIG. 2 is an exemplary illustration of a vehicular haptic feedback system workflow, according to certain aspects.

FIG. 2 is an exemplary illustration of a vehicular haptic feedback system workflow 200, according to certain aspects. The vehicular haptic feedback system workflow 200 describes the acquisition of quality of operation information, direction and intensity of threat information, and mode of operation information. The utilization of such information is used to determine a desired direction of travel, whereby haptic feedback corresponding to the quality of operation information, direction and intensity of threat information, mode of operation information, and desired direction of travel of the vehicle 102 is generated.

The haptic feedback controller 104 is configured to communicate with vehicle 102 to provide the driver of the vehicle 102 with quality of operation information, threat information, and mode of operation information. The processing circuitry of the haptic feedback controller 104 is configured to detect quality of operation information 202 of the vehicle 102, detect a direction and an intensity of threat information 204 corresponding to the vehicle 102, and detect a mode of operation 206 of the vehicle 102, via data received from the one or more sensors 112.

The quality of operation information can be utilized by the circuitry to present information to the driver that requires the attention of the driver. The quality of operation information of the vehicle 102 can include information that provides the user with traffic info' cation, relevant road structure information, and the like. For example, the quality of operation information of the vehicle 102 can include an upcoming, banking turn in which the driver must slow down. The quality of operation information can be provided to the user via haptic feedback at the seat, in the form of a predetermined pattern, indicating to the driver that the vehicle 102 must be slowed to safely navigate the upcoming road structure.

The quality of operation information describes an expected performance quality of vehicle 102, given the current sensing capabilities, the road environment, and the control capabilities. In a first example, when a lane marking detection accuracy and a mapping localization accuracy are of a high quality, the vehicle 102 produces a "high" quality of operation signal, which indicates vehicle 102 is able to smoothly estimate and follow a lane center. In a second example, the estimation of lane marker curvature may be noisy, which indicates vehicle 102 may wander inside of the lane, but still be able to prevent any lane excursion. Therefore, the quality of operation would be "medium," indicating the dynamics of vehicle 102 are safe but not smooth. In a third example, a total loss of localization may cause the quality of operation of vehicle 102 to degrade to "low," indicating the driver should resume manual control.

The direction and the intensity of threat information can be utilized by the circuitry to present information to the driver that requires the attention of the driver. For example, the direction and the intensity of threat information of the vehicle 102 can include an identified threat that the vehicle 102 will encounter if the present course of navigation is not changed. In certain aspects of the present disclosure, the circuitry can be configured to determine the speed of the vehicle 102, the speed of the threat, and the direction of the threat when a threat is identified. The circuitry can also be configured to indicate the presence of multiple threats to the driver via the haptic feedback. Further, the circuitry can be configured to determine the most severe threat, and actuate the haptic feedback actuators to provide a predetermined pattern to indicate which threat is most severe. In some aspects, the circuitry can be configured to provide haptic feedback at the seat of the vehicle 102 that includes a persistent, nominal pattern when no threat is presently detected.

The mode of operation information can be utilized by the circuitry to present information to the driver that requires the attention of the driver. For example, the mode of operation information of the vehicle 102 can include the current autonomous level of the vehicle 102. An autonomous level provides an operating state for vehicle 102 at a particular level without influence or interference from another level. Each autonomous level is independent of other autonomous levels. Additionally, the mode of operation information can indicate to the driver when the vehicle 102 is transitioning between different levels of autonomous modes. Modes of operation can be configured to communicate any one of a current mode of vehicle 102, a mode to which vehicle 102 is changing, and one or more modes in which vehicle 102 is allowed (i.e. when a driver shifts to any of the allowable modes, vehicle 102 will not block the transition).

In some aspects of the present disclosure, the mode of operation of the vehicle 102 corresponds to the National Highway Traffic Safety Administration (NHTSA) Policy for vehicle automation. In this instance, the circuitry can be configured to provide a different pattern of haptic feedback to the driver for each of the five levels of the NHTSA Policy (No-Automation: Level 0, Function-specific Automation: Level 1, Combined Function Automation: Level 2, Limited Self-Driving Automation: Level 3, and Full Self-Driving Automation Level 4.

In other aspects of the present disclosure, the mode of operation of the vehicle 102 corresponds to the Society of Automotive Engineers (SAE) Standard of Driving Automation. In this instance, the circuitry can be configured to provide a different pattern of haptic feedback to the driver for each of the six levels of the SAE Standard of Driving Automation (No Automation: Level 0, Driver Assistance: Level 1, Partial Automation: Level 2, Conditional Automation: Level 3, High Automation: Level 4, and Full Automation: Level 5).

The mode of operation information can include modes that correspond to other autonomous modes of driving, as well as modes that do not correspond to modes of driving automation.

The circuitry of the haptic feedback controller 104 can also be configured to determine a desired direction of travel 208, based on the detected quality of operation information 202, direction and intensity of threat information 204, and mode of operation 206 using data received from the one or more sensors 112. For example, the circuitry can determine a direction of navigation that is suitable to avoid a potential threat. As such, the circuitry can be configured to utilize the determined speed of the vehicle 102 and the speed of the threat to indicate a corresponding direction of navigation to avoid the hazardous situation.

The circuitry can further be configured to determine haptic feedback 210 corresponding to the desired direction of travel, the quality of operation information, the direction and the intensity of threat information and the mode of operation. The circuitry can provide the haptic feedback 212 via haptic feedback actuators, such as piezoelectric haptic devices located at the seat, the external device, and the like. For example, in the instance where a threat is detected, the circuitry can initiate a patterned pulse of haptic feedback at the seat of the vehicle 102 moving in the direction of the threat at a speed commensurate with the threat. In another example, the circuitry can provide haptic feedback in rows corresponding to the mode of operation. In this instance, where the SAE Standard of Driving Automation is utilized, a single row of haptic feedback can correspond to Driver Assistance: Level 1, two rows of haptic feedback can correspond to Partial Automation: Level 2, and the like. In another example, when the vehicle is detected to be transitioning between modes of operation, the circuitry can be configured to vibrate all of the haptic devices simultaneously.

The patterns utilized by the circuitry to denote different indications can correspond to a variety of parameters including pattern type, starting point of a pattern, ending point of a pattern, speed of a pattern, directionality of a pattern, and the like. The parameter of pattern type can include outward haptic feedback and inward haptic feedback. As such, the outward haptic feedback can indicate a direction at which the threat is detected. On the other hand, the inward haptic feedback can indicate that no threat is presently detected. The parameter of starting point of the pattern can be used in conjunction with the parameter of ending point of the pattern to indicate a distance to the threat. The parameter of speed of the pattern can indicate a time of collision for the vehicle 102, the closing speed of the threat, and/or the general level of threat intensity. The parameter of directionality of the pattern can indicate the direction of the potentially hazardous situation or threat.

Figure 3A:
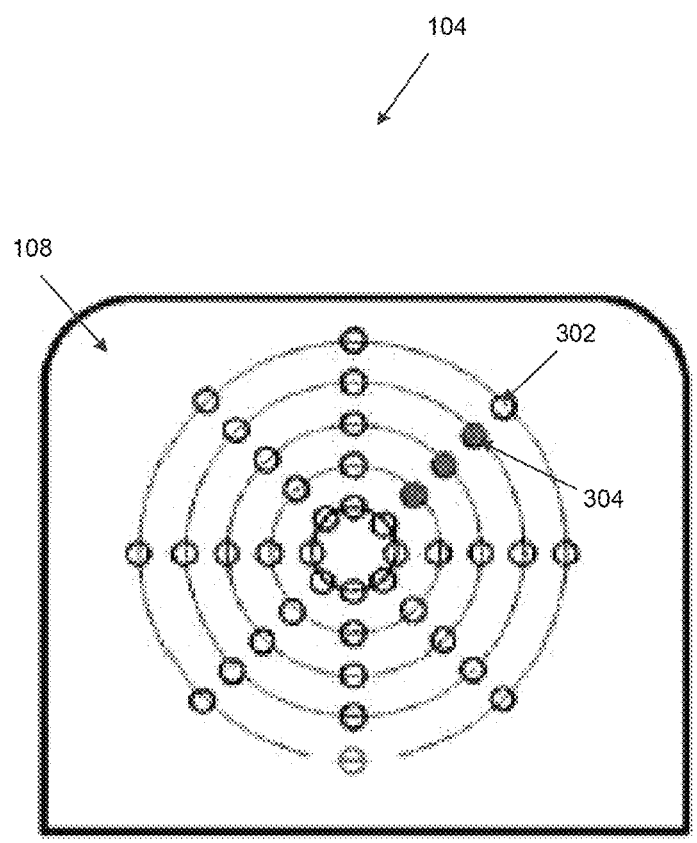
FIG. 3A is an exemplary illustration of a haptic feedback apparatus, according to certain aspects.

FIG. 3A is an exemplary illustration of a haptic feedback controller 104, according to certain aspects. The haptic feedback controller 104 can include an array of piezoelectric haptic feedback actuators 304 located at a seat of vehicle 102. In certain aspects, the haptic feedback actuators 304 can be located at a seat base 108 of the seat. FIG. 3A also includes a plurality of unactuated haptic devices 302 (i.e., haptic devices which are not currently activated). The haptic feedback actuators 304 can be utilized by the processing circuitry of the haptic feedback controller 104 to provide feedback to the driver of the vehicle 102 to indicate the current state of the vehicle 102. The haptic feedback provided by the circuitry provides persistent feedback to the driver, due to the subtle nature of the haptic feedback patterns via the array of haptic feedback actuators 304. The haptic feedback illustrated in FIG. 3A is a two-dimensional pattern array. In certain aspects, the vehicle 102 is an autonomous vehicle and the circuitry is configured to provide the driver with information via haptic feedback in situations where the driver may want to resume manual control over the vehicle 102. In this instance, the driver can be given the option to resume manual control over the vehicle 102 entirely, or to a certain degree corresponding to a predetermined mode of operation.

In certain aspects, the circuitry can be configured to provide haptic feedback in a plurality of patterns. The plurality of patterns can include a plurality of parameters that correspond to automated levels of the vehicle, levels of threat intensity, level of quality of operation information, and the like. Further, the parameters of the patterns can include pattern type, starting point of a pattern, ending point of a pattern, speed of a pattern, directionality of a pattern, and the like. For example, in FIG. 3A, the array of haptic devices includes haptic feedback actuators 304 that can correspond to an identified threat. The haptic feedback actuators 304 can indicate where the threat is detected, which results in a patterned pulse of haptic feedback at the seat base 108 of the vehicle 102, moving in a direction of the threat at a speed commensurate with the threat, via the haptic feedback actuators 304.

Figure 3B:
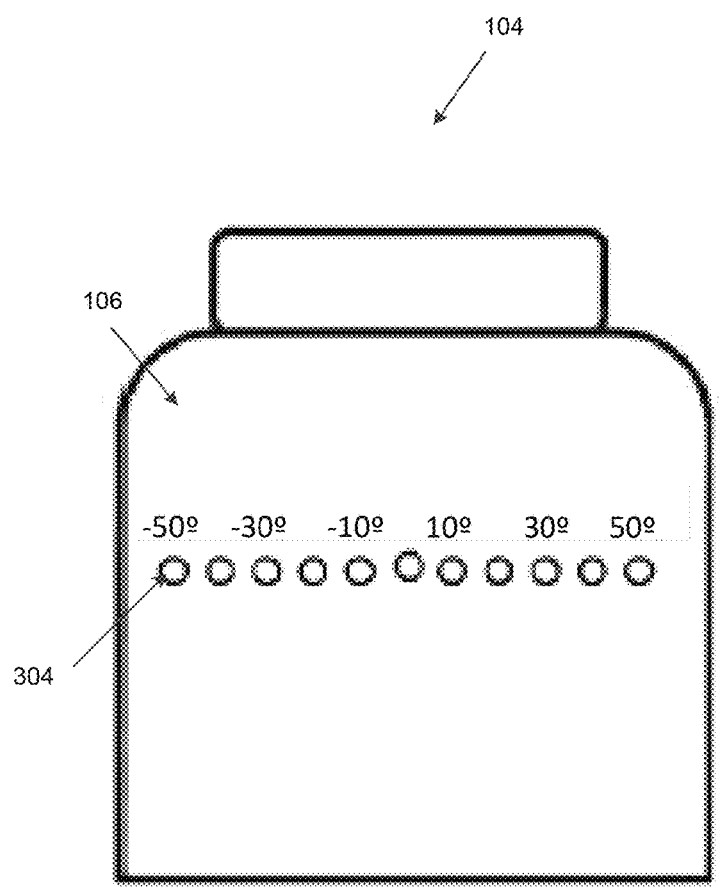
FIG. 3B is an exemplary illustration of a haptic feedback apparatus, according to certain aspects.

FIG. 3B is an exemplary illustration of a haptic feedback controller 104, according to certain aspects. The haptic feedback controller 104 can include a row of piezoelectric haptic feedback actuators 304 located at a seat of vehicle 102. In certain aspects, the haptic feedback actuators 304 are located at a seat back 106 of the seat. The haptic feedback actuators 304 can be utilized by the processing circuitry of the haptic feedback controller 104 to provide feedback to the driver of the vehicle 102 to indicate the current state of the vehicle 102. The haptic feedback provided by the circuitry provides persistent feedback to the driver, due to the subtle nature of the haptic feedback patterns via the array of haptic feedback actuators 304. The haptic feedback illustrated in FIG. 3B is a one-dimensional pattern array. In certain aspects, the vehicle 102 is an autonomous vehicle and the circuitry is configured to provide the driver with information via haptic feedback in situations where the driver may want to resume manual control over the vehicle 102. In this instance, the driver can be given the option to resume manual control over the vehicle 102 entirely, or to a certain degree corresponding to a predetermined mode of operation. The haptic feedback actuators 304 can indicate where the threat is detected, which results in a patterned pulse of haptic feedback at the seat base 108 of the vehicle 102 moving in the direction of the threat at a speed commensurate with the threat, via the haptic feedback actuators 304.

In certain aspects, the circuitry can be configured to provide haptic feedback in a plurality of patterns. The plurality of patterns can include a plurality of parameters that correspond to automated levels of the vehicle 102, levels of threat intensity, level of quality of operation information, and the like. Further, the parameters of the patterns can include pattern type, starting point of a pattern, ending point of a pattern, speed of a pattern, directionality of a pattern, and the like. For example, in FIG. 3B, the row of haptic feedback actuators 304 are utilized by processing circuitry of the haptic feedback controller 104 to convey a threat in a forward direction. The forward direction can correspond to the forward direction of the driver as he/she operates the vehicle 102. The haptic feedback actuators 304 can indicate where the threat is detected, which results in a patterned pulse of haptic feedback at the seat back 106 of the vehicle 102 in which an angular direction of the threat is provided to the driver, via the haptic feedback actuators 304.

Figure 4:
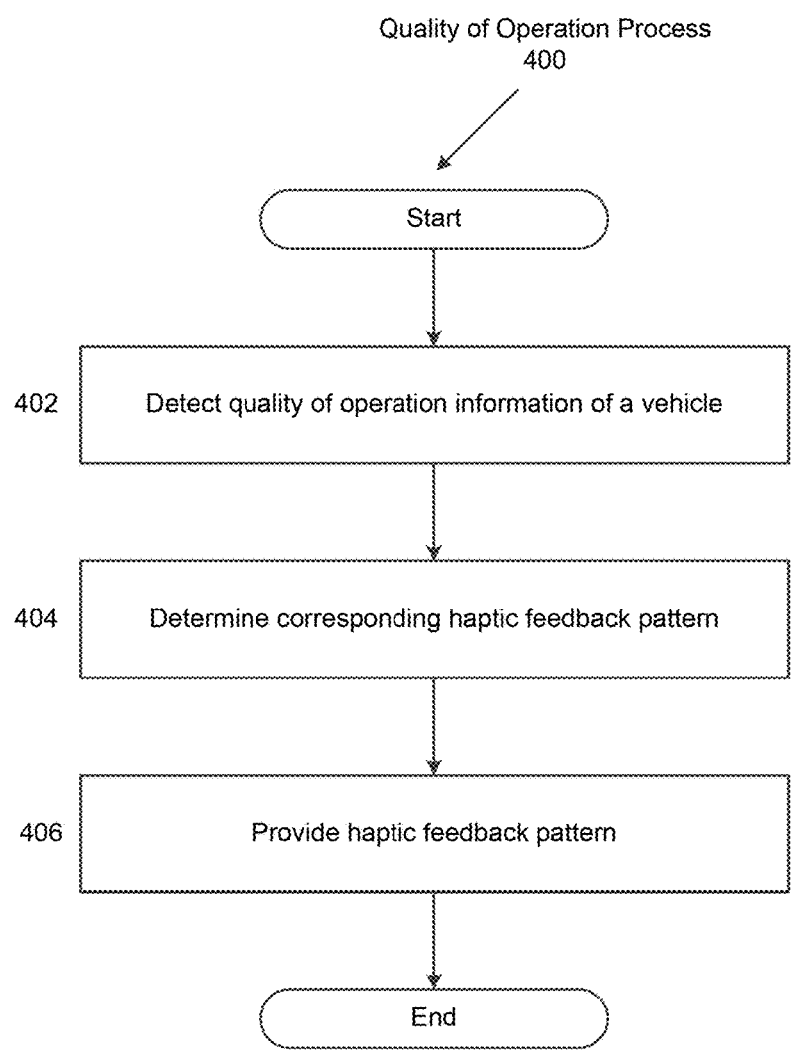
FIG. 4 is an algorithmic flowchart of a quality of operation process, according to certain exemplary aspects.

FIG. 4 is an algorithmic flowchart of a quality of operation process 400, according to certain exemplary aspects. The quality of operation process 400 describes a process of presenting information to a driver of a vehicle 102, corresponding to external encounters the driver may encounter when operating the vehicle 102. At step 402, the circuitry of the haptic feedback controller 104 detects quality of operation information of a vehicle 102 via data received from the one or more sensors 112. The quality of operation information of the vehicle 102 can include information that provides the user with traffic information, relevant road structure information, and the like. For example, the quality of operation information of the vehicle 102 can include an upcoming, banking turn in which the driver should reduce his/her speed.

At step 404, the circuitry of the haptic feedback controller 104 determines a haptic feedback pattern, corresponding to the operation information of the vehicle 102 via data received from the one or more sensors 112. The haptic feedback pattern can correspond to a variety of parameters, including pattern type, starting point of a pattern, ending point of a pattern, speed of a pattern, directionality of a pattern, and the like.

At step 406, the circuitry of the haptic feedback controller 104 provides the determined haptic feedback pattern to the driver. The quality of operation information can be provided to the driver via haptic feedback actuators 304 located at the seat base 108 of the seat of the vehicle 102. For example, the quality of operation information can be provided to the driver via haptic feedback at the seat, in the form of a predetermined pattern, indicating to the driver that the vehicle 102 must be slowed to safely navigate the upcoming road structure.

Figure 5:
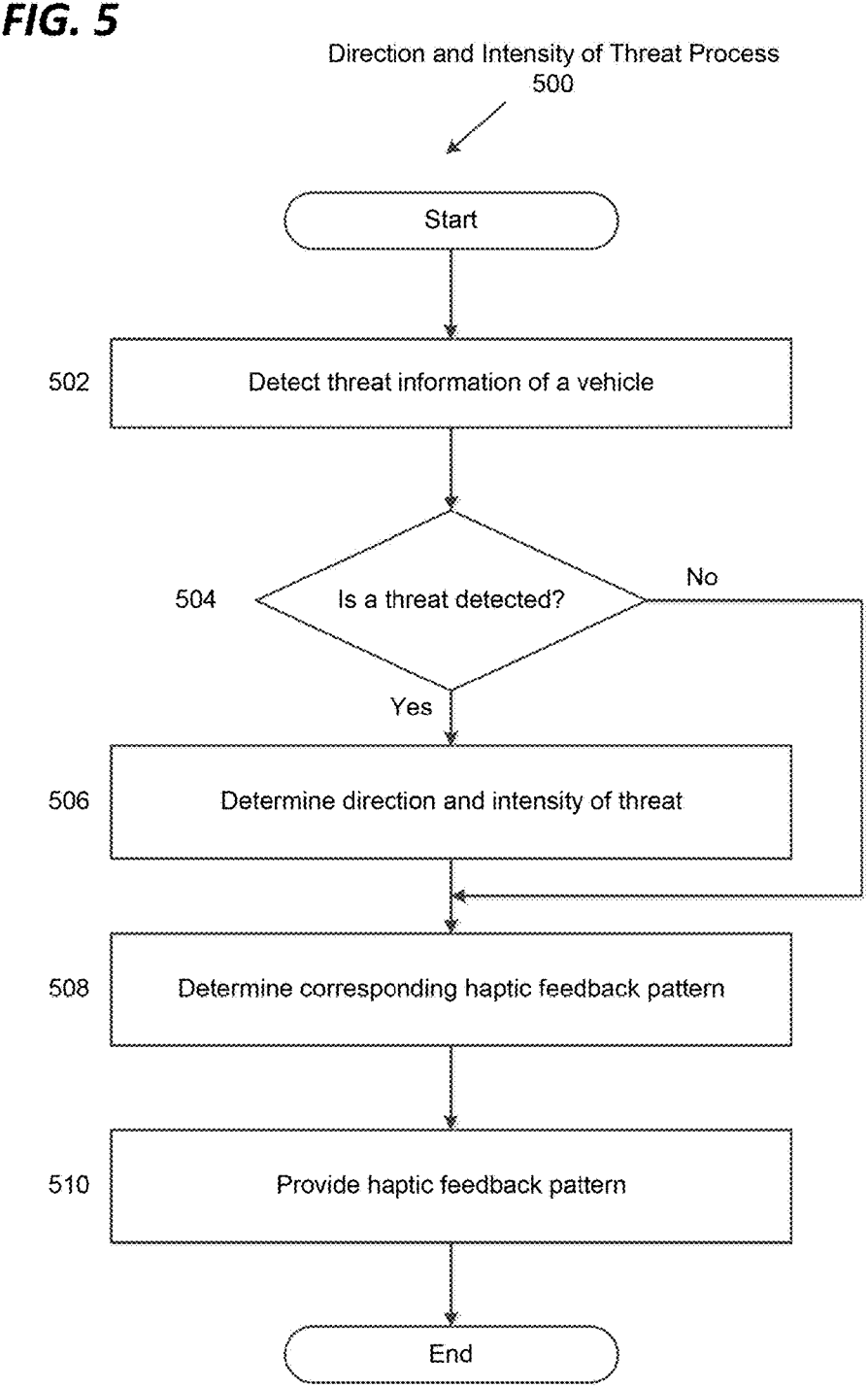
FIG. 5 is an algorithmic flowchart of a direction and intensity of threat process, according to certain exemplary aspects.

FIG. 5 is an algorithmic flowchart of a direction and intensity of threat process 500, according to certain exemplary aspects. The direction and intensity of threat process 500 describes a process of presenting information to a driver of a vehicle 102, corresponding to the presence of a threat in relation to the safe operation of the vehicle 102. At step 502, the circuitry of the haptic feedback controller 104 detects threat information of the vehicle via data received from the one or more sensors 112. For example, the threat information of the vehicle 102 can include an identified threat the vehicle 102 may encounter if the present course of navigation is not altered.

At step 504, a determination is made whether a substantial threat is detected via data received from the one or more sensors 112. The processing circuitry of the haptic feedback controller 104 can be configured to compare a detected event in the vicinity of the vehicle 102 to a predetermined threshold in order to determine if the detected event should ultimately be considered a substantial threat or deterrent to the safe operation of the vehicle 102. If the detected event is determined to be a substantial threat, resulting in a "yes" at step 504, the direction and intensity of threat process 500 will proceed to step 506. Otherwise, if the detected event is determined not to be a substantial threat, resulting in a "no" at step 504, the direction and intensity of threat process 500 will proceed to step 508.

At step 506, the circuitry of the haptic feedback controller 104 is configured to determine the direction and the intensity of the threat. In certain aspects of the present disclosure, the circuitry can be configured to determine the speed of the vehicle 102, the speed of the threat, and the direction of the threat, via data received from the one or more sensors 112 when a threat corresponding to a potential hazardous situation is identified.

At step 508, the circuitry of the haptic feedback controller 104 is configured to determine a haptic feedback pattern corresponding to the direction and the intensity of the threat via data received from the one or more sensors 112. For example, the circuitry can determine a persistent, nominal haptic feedback pattern, if no threat is detected. On the other hand, the circuitry can determine a patterned pulse of haptic feedback in the direction of the threat, if a threat is determined to be present.

At step 510, the circuitry is configured to provide the determined haptic feedback pattern corresponding to the determined direction and intensity of the threat. The circuitry can be configured to indicate the presence of multiple threats to the driver via the haptic feedback. Further, the circuitry can be configured to determine the most severe threat, and actuate the haptic feedback actuators 304 to provide a predetermined pattern that indicates to the user which threat is most severe. In some aspects, the circuitry can be configured to provide haptic feedback at the seat of the vehicle 102 via the seat base 108 and/or the seat back 106.

Figure 6:
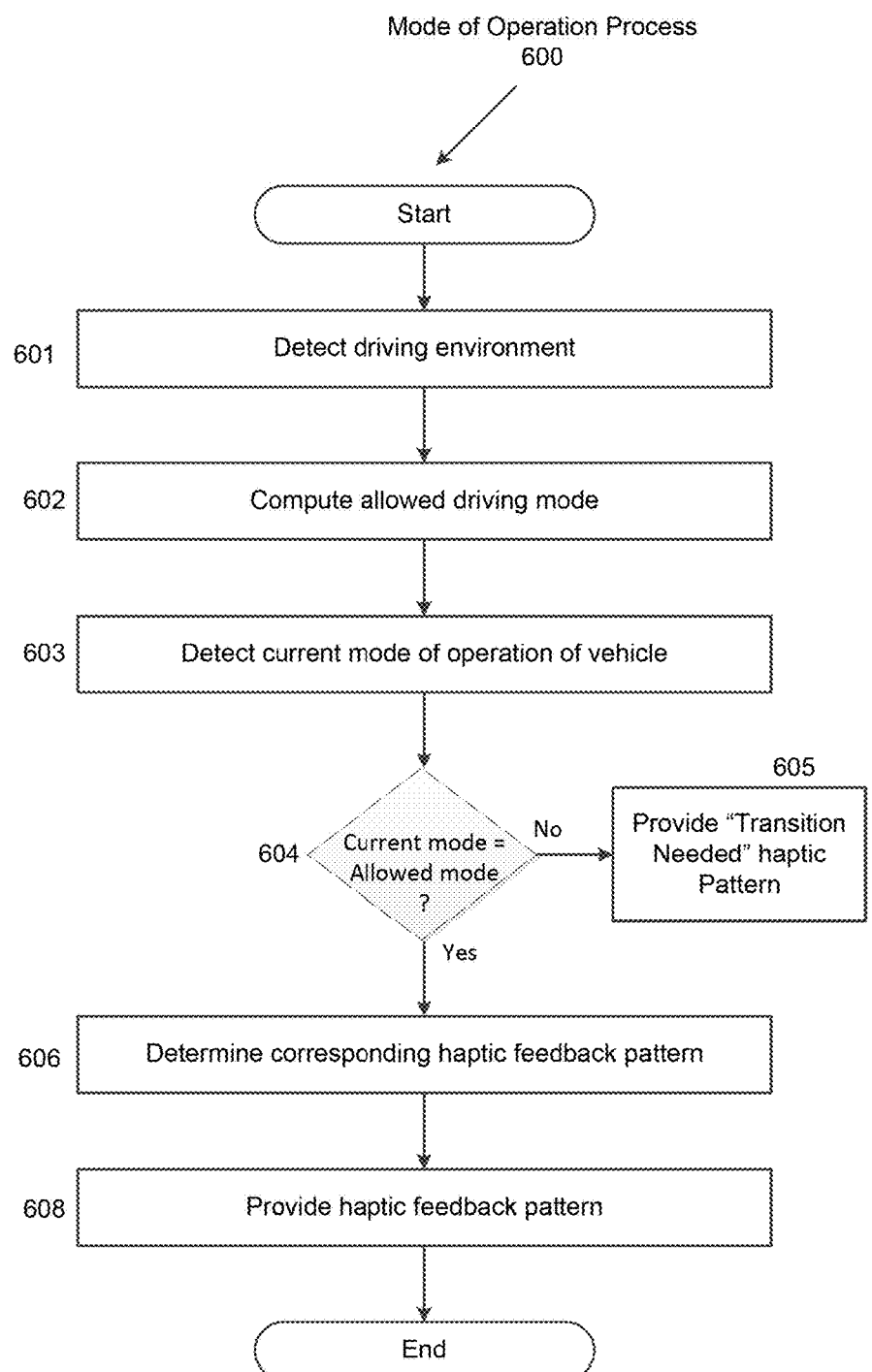
FIG. 6 is an algorithmic flowchart of a mode of operation process, according to certain exemplary aspects.

FIG. 6 is an algorithmic flowchart of a mode of operation process 600, according to certain exemplary aspects. At step 601, a driving environment of vehicle 102 is detected via circuitry of the haptic feedback controller 104. The mode of operation process 600 describes a process of presenting information to a driver of vehicle 102, corresponding to an operating state of the vehicle 102. At step 602, the circuitry of the haptic feedback controller 104 computes one or more allowed driving modes from the detected driving environment. At step 603, the circuitry of the haptic feedback controller 104 detects a current mode of operation of the vehicle 102. For example, the mode of operation information can indicate vehicle 102 is currently at a fully autonomous level.

In some aspects of the present disclosure, the mode of operation of the vehicle 102 corresponds to the National Highway Traffic Safety Administration (NHTSA) Policy for vehicle automation. In other aspects, the mode of operation of the vehicle 102 corresponds to the Society of Automotive Engineers (SAE) Standard of Driving Automation. The mode of operation information can include modes that correspond to other autonomous modes of driving that are known, as well as modes that do not correspond to modes of driving automation.

At step 604, the processing circuitry of the haptic feedback controller 104 determines whether a current mode of vehicle 102 is an allowed mode. If vehicle 102 is not in an allowed mode (a no decision in step 604), a "transition needed" haptic pattern is provided in step 605. For example, the circuitry can be configured to determine a different pattern of haptic feedback to the driver for each of the five levels of the NHTSA Policy (No-Automation: Level 0, Function-specific Automation: Level 1, Combined Function Automation: Level 2, Limited Self-Driving Automation: Level 3, and Full Self-Driving Automation Level 4). In another example, the circuitry can be configured to provide a different pattern of haptic feedback to the driver for each of the six levels of the SAE Standard of Driving Automation (No Automation: Level 0, Driver Assistance: Level 1, Partial Automation: Level 2, Conditional Automation: Level 3, High Automation: Level 4, and Full Automation: Level 5).

After step 605 or when vehicle 102 is in an allowed mode (a yes decision in step 604), the process proceeds to step 606. At step 606, the processing circuitry of the haptic feedback controller 104 determines a haptic feedback pattern, which corresponds to an allowed mode of operation.

At step 608, the circuitry is configured to provide the determined haptic feedback pattern corresponding to the allowed mode of operation of the vehicle 102. In some aspects, the haptic feedback provided can include mode of operation information which indicates to the driver when the vehicle 102 is transitioning between different levels of autonomous modes. In an example, the circuitry can provide haptic feedback in rows corresponding to the mode of operation. In this instance, where the SAE Standard of Driving Automation is utilized, a single row of haptic feedback can correspond to Driver Assistance: Level 1, two rows of haptic feedback can correspond to Partial Automation: Level 2, and the like. In another example, when the vehicle 102 is detected to be transitioning between modes of operation, the circuitry can be configured to vibrate all of the haptic devices simultaneously. In some aspects, the circuitry can be configured to provide haptic feedback at the seat of the vehicle 102 via the seat base 108 and/or the seat back 106.

Figure 7:
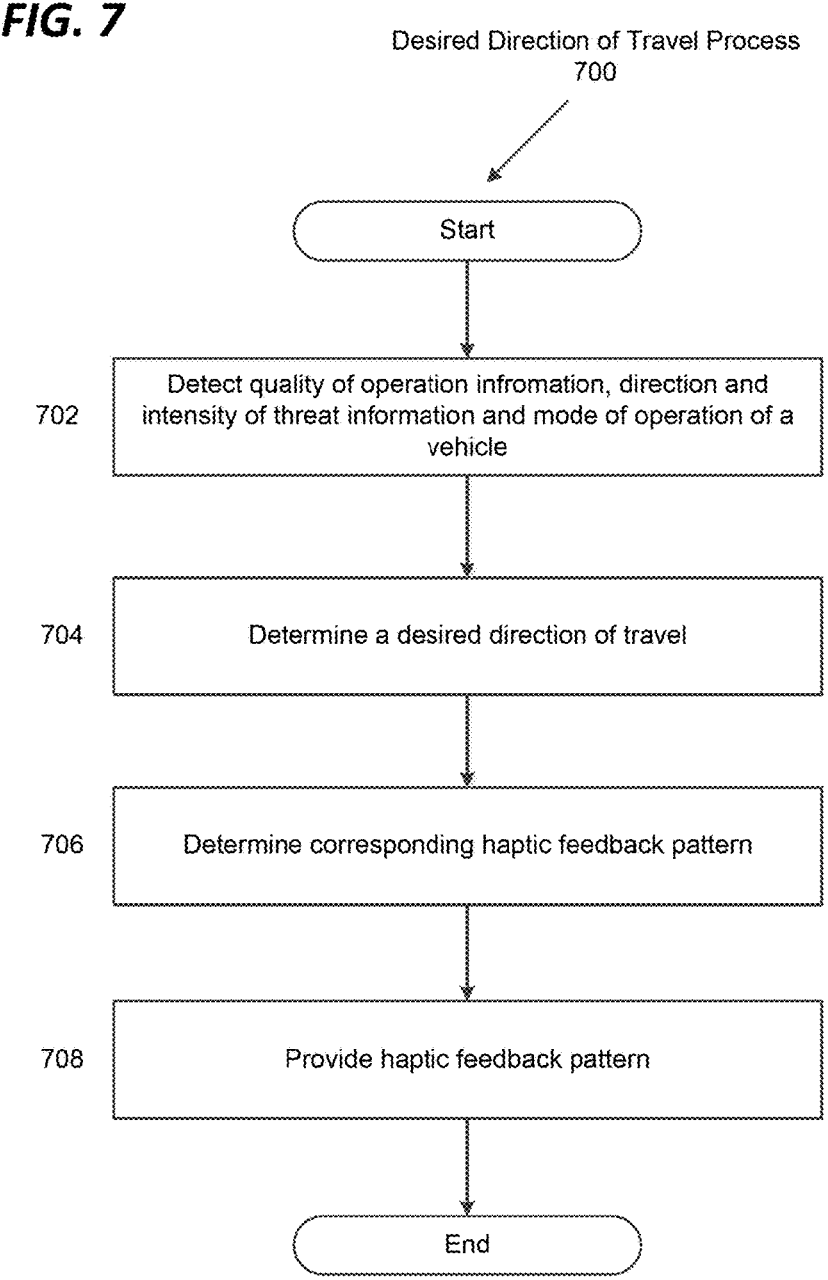
FIG. 7 is an algorithmic flowchart of a desired direction of travel process, according to certain exemplary aspects.

FIG. 7 is an algorithmic flowchart of a desired direction of travel process 700, according to certain exemplary aspects. The desired direction of travel process 700 describes a process of presenting information to a driver of a vehicle 102, corresponding to cues for a particular calculated navigational path. At step 702, the circuitry of the haptic feedback controller 104 is configured to detect quality of operation information, direction and intensity of threat information, and mode of operation of the vehicle 102 via data received from the one or more sensors 112.

At step 704, the circuitry of the haptic feedback controller 104 determines a desired direction of travel based on the detected quality of operation information, direction and intensity of threat information, and mode of operation via data received from the one or more sensors 112. For example, the circuitry can determine a desired direction of travel that is suitable to avoid a potential threat. The circuitry can be configured to utilize the determined speed of the vehicle 102 and speed of the threat to indicate a corresponding direction of navigation along a determined path of safe operation to avoid the hazardous situation.

At step 706, the circuitry is configured to determine haptic feedback corresponding to the desired direction of travel. The haptic feedback can include a pattern that indicates a safe direction of travel to the user via the haptic feedback actuators 304.

At step 708, the circuitry is configured to provide haptic feedback corresponding to the desired direction of travel. In some aspects, the circuitry can be configured to provide haptic feedback at the seat of the vehicle 102 via the seat base 108 and/or the seat back 106.

The vehicular haptic feedback system 100 can utilize spatio-temporal haptic feedback in a vehicle 102 to provide threat information, quality of operation information, autonomous mode operation information, and desired direction of travel information to a driver of the vehicle 102. As such, the vehicular haptic feedback system 100 can aid a driver in the operation of an autonomous vehicle, a semi-autonomous vehicle, a vehicle, and the like. The haptic feedback is configured to provide the driver with indications of driving conditions, road structure, hazardous threats, and directional information. By providing persistent feedback to the driver, corresponding to vehicle operation information as well as information pertaining to the surrounding environment of the vehicle, the vehicular haptic feedback system 100 can be configured to enable safe operation of the vehicle 102 by presenting a continuous stream of information to the driver.

Figure 8:
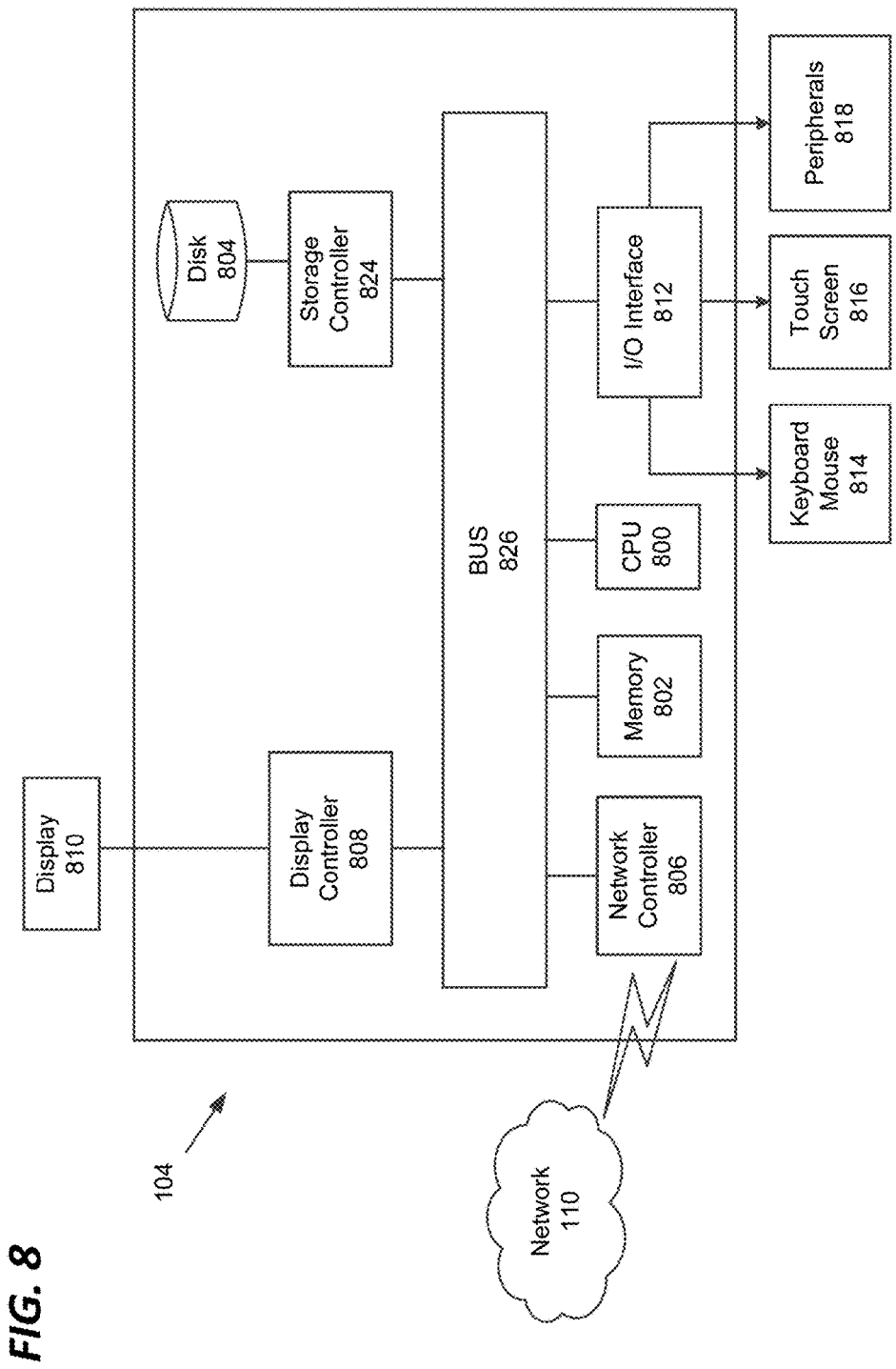
FIG. 8 illustrates a hardware block diagram of a haptic feedback apparatus, according to certain exemplary aspects.

FIG. 8 illustrates a hardware block diagram of a haptic feedback controller 104, according to certain exemplary aspects. In FIG. 8, the haptic feedback controller 104 includes a CPU 800 which performs the processes described above/below. For example, the CPU 800 provides haptic feedback via the feedback actuators. The CPU 800 can be configured to provide haptic feedback in a plurality of patterns, and the plurality of patterns can include a plurality of parameters that correspond to automated levels of the vehicle, levels of threat intensity, level of quality of operation information, and the like. Further, the parameters corresponding to the patterns can include pattern type, starting point of a pattern, ending point of a pattern, speed (i.e., firing rate) of a pattern, directionality of a pattern, and the like.

The process data and instructions may be stored in memory 802. These processes and instructions may also be stored on a storage medium disk 804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the haptic feedback controller 104 communicates, such as a server or computer.

Further, the claimed advancements may be provided as a utility application, background daemon, or component of an operating system, or combination thereof, executing in conjunction with CPU 800 and an operating system such as Microsoft Windows, UNIX, Solaris, LINUX, Apple MAC-OS and other systems known to those skilled in the art.

The hardware elements in order to achieve the haptic feedback controller 104 may be realized by various circuitry elements, known to those skilled in the art. For example, CPU 800 may be a Xenon or Core processor from Intel of America or an Opteron processor from AMD of America, or may be other processor types that would be recognized by one of ordinary skill in the art. Alternatively, the CPU 800 may be implemented on an FPGA, ASIC, PLD or using discrete logic circuits, as one of ordinary skill in the art would recognize. Further, CPU 800 may be implemented as multiple processors cooperatively working in parallel to perform the instructions of the inventive processes described above.

The exercise activity apparatus in FIG. 8 also includes a network controller 806, such as an Intel Ethernet PRO network interface card from Intel Corporation of America, for interfacing with network 110. As can be appreciated, the network 110 can be a public network, such as the Internet, or a private network such as an LAN or WAN network, or any combination thereof and can also include PSTN or ISDN sub-networks. The network 110 can also be wired, such as an Ethernet network, or can be wireless such as a cellular network including EDGE, 3G and 4G wireless cellular systems. The wireless network can also be Wi-Fi, BLUETOOTH, or any other wireless form of communication that is known.

The haptic feedback controller 104 further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a touch screen panel 816 on or separate from display 810. General purpose I/O interface also connects to a variety of peripherals 818 including printers and scanners, such as an OfficeJet or DeskJet from Hewlett Packard.

The general purpose storage controller 824 connects the storage medium disk 804 with communication bus 826, which may be an ISA, EISA, VESA, PCI, or similar, for interconnecting all of the components of the haptic feedback controller 104. A description of the general features and functionality of the display 810, as well as the display controller 808, storage controller 824, network controller 806, and general purpose I/O interface 812 is omitted herein for brevity.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9

Figure 9:
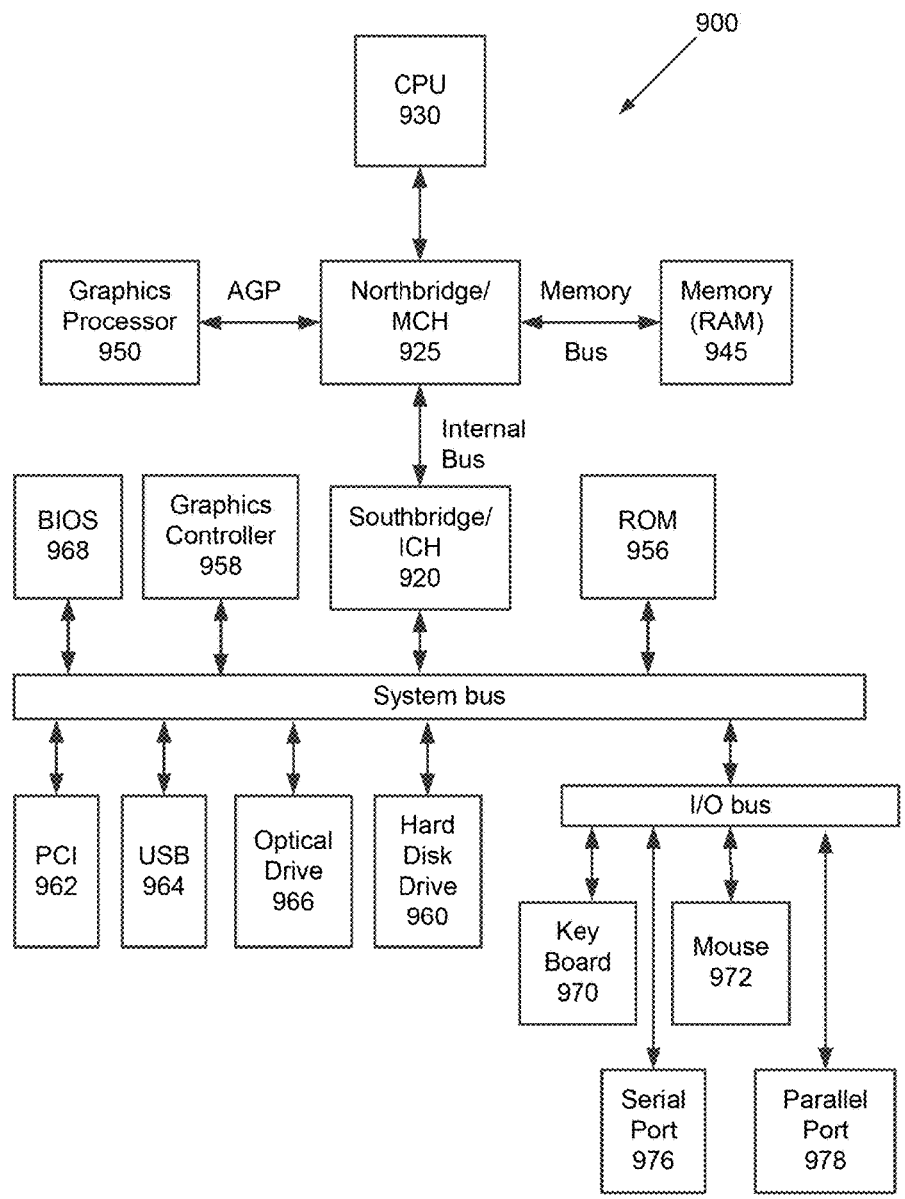
FIG. 9 illustrates a hardware block diagram of a data processing system, according to certain exemplary aspects.

FIG. 9 illustrates a hardware block diagram of a data processing system 900, according to certain exemplary aspects of the present disclosure. The data processing system is an example of a computer in which code or instructions implementing the processes of the illustrative aspects may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
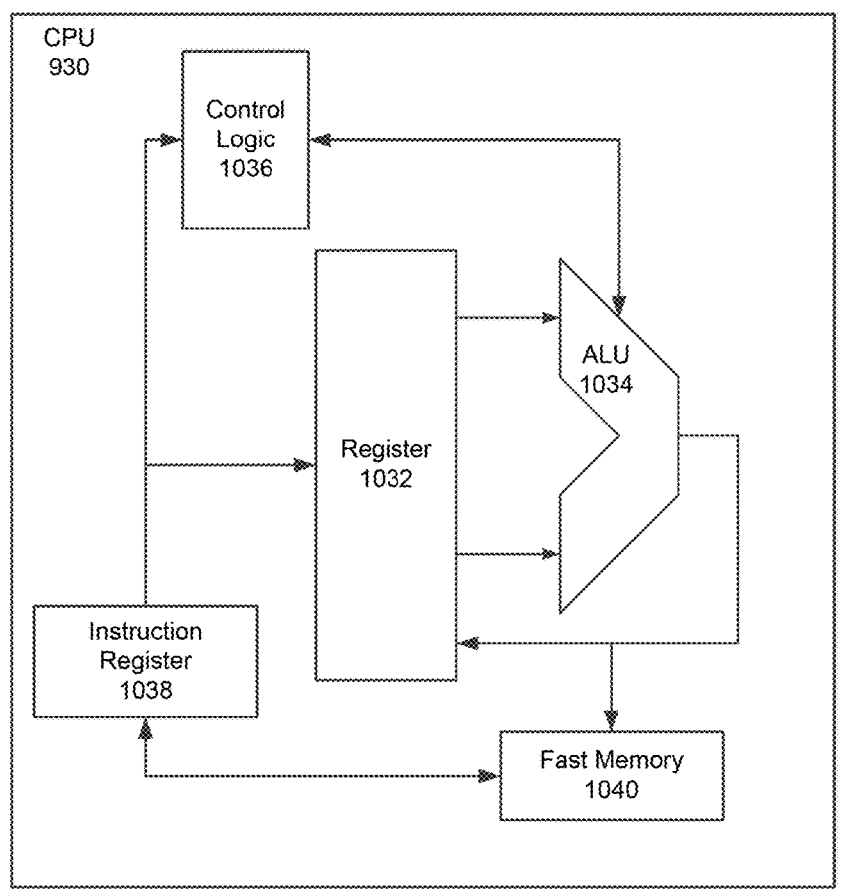
FIG. 10 illustrates a hardware block diagram of a CPU, according to certain exemplary aspects.

FIG. 10 illustrates a hardware block diagram of a CPU, according to certain exemplary aspects of the present disclosure. For example, FIG. 10 shows one implementation of CPU 930. In one implementation, the instruction register 1038 retrieves instructions from the fast memory 1040. At least part of these instructions are fetched from the instruction register 1038 by the control logic 1036 and interpreted according to the instruction set architecture of the CPU 930. Part of the instructions can also be directed to the register 1032. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain implementations, the instruction set architecture of the CPU 930 can use a reduced instruction set architecture, a complex instruction set architecture, a vector processor architecture, a very large instruction word architecture. Furthermore, the CPU 930 can be based on the Von Neuman model or the Harvard model. The CPU 930 can be a digital signal processor, an FPGA, an ASIC, a PLA, a PLD, or a CPLD. Further, the CPU 930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 900 can include that the SB/ICH 920 is coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH YYY through a PCI bus 962.

The PCI devices may include, for example, Ethernet adapters, add-in cards, and PC cards for notebook computers. The Hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 960 and optical drive 966 can also be coupled to the SB/ICH 920 through a system bus. In one implementation a parallel port 978 and a serial port 976 can be connected to the system bust through the I/O bus. Other peripherals and devices that can be connected to the SB/ICH 920 using a mass storage controller such as SATA or PATA, an Ethernet port, an ISA bus, a LPC bridge, SMBus, a DMA controller, and an Audio Codec.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process.

The above-described hardware description is a non-limiting example of corresponding structure for performing the functionality described herein.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A vehicular haptic feedback system, comprising:
 a haptic feedback controller configured to communicate with a vehicle, the haptic feedback controller including a plurality of haptic feedback actuators and processing circuitry configured to
  detect, via data received from one or more sensors, quality of operation information of the vehicle, threat information corresponding to the vehicle, and a mode of operation of the vehicle,
  determine, via the data received from the one or more sensors, a desired direction of travel of the vehicle based on the quality of operation information, the threat information, and the mode of operation, and
  provide haptic feedback corresponding to the quality of operation information, the threat information, the mode of operation, and the desired direction of travel of the vehicle via the plurality of haptic feedback actuators,
 wherein the haptic feedback includes a plurality of patterns having a plurality of parameters that correspond to a plurality of automated levels of the vehicle, a plurality of levels of threat intensity, and a plurality of levels of quality of operation information.

2. The vehicular haptic feedback system of claim 1, wherein the vehicle is an automobile, a truck, a van, a sport utility vehicle, an autonomous automobile, an autonomous truck, an autonomous van, or an autonomous sport utility vehicle.

3. The vehicular haptic feedback system of claim 1, wherein the vehicle includes a seat having a seat base and a seat back.

4. The vehicular haptic feedback system of claim 3, wherein the haptic feedback controller is located at the seat.

5. The vehicular haptic feedback system of claim 1, wherein the haptic feedback controller is located at an external device including at least one of a glove, a shoe insert, a pedal, a foot rest, a floor mat, and a steering wheel.

6. The vehicular haptic feedback system of claim 1, wherein the plurality of haptic feedback actuators include piezoelectric haptic devices and one or more devices which generate one or more of a vibration, a heating or cooling sensation, and an air pressure.

7. The vehicular haptic feedback system of claim 1, wherein the haptic feedback includes a persistent pattern of the plurality of haptic feedback actuators when a threat is not detected.

8. The vehicular haptic feedback system of claim 1, wherein the processing circuitry is further configured to:
 determine a speed of the vehicle, a speed of a threat, and a direction of the threat.

9. The vehicular haptic feedback system of claim 8, wherein the haptic feedback corresponding to the threat information includes a pattern of the plurality of haptic feedback actuators in the direction of the threat at a speed corresponding to the speed of the threat.

10. The vehicular haptic feedback system of claim 1, wherein the plurality of parameters include pattern type, starting point of a pattern, ending point of a pattern, speed of a pattern, and directionality of a pattern.

11. The vehicular haptic feedback system of claim 1, wherein the processing circuitry is further configured to:
 determine the desired direction of travel and the quality of operation information based on road structure in which the vehicle is navigating.

12. A method of vehicular haptic feedback, comprising:
 detecting, via data received from one or more sensors, quality of operation information of a vehicle, threat information corresponding to the vehicle, and a mode of operation of the vehicle,
 determining, via the data from the one or more sensors, a desired direction of travel of the vehicle based on the quality of operation information, the threat information, and the mode of operation, and
 providing, via processing circuitry of a haptic feedback controller, haptic feedback corresponding to the quality of operation information, the threat information, the mode of operation, and the desired direction of travel of the vehicle from a plurality of haptic feedback actuators,
 wherein the haptic feedback includes a plurality of patterns having a plurality of parameters that correspond to a plurality of automated levels of the vehicle, a plurality of levels of threat intensity, and a plurality of levels of quality of operation information.

13. The method of claim 12, wherein the haptic feedback includes a persistent pattern of the plurality of haptic feedback actuators when a threat is not detected.

14. The method of claim 12, further comprising:
 determining a speed of the vehicle, a speed of a threat and a direction of the threat.

15. The method of claim 14, wherein the haptic feedback corresponding to the threat information includes a pattern of the plurality of haptic feedback actuators in the direction of the threat at a speed corresponding to the speed of the threat.

16. The method of claim 12, wherein the plurality of parameters include pattern type, starting point of a pattern, ending point of a pattern, speed of a pattern, and directionality of a pattern.

17. The haptic feedback system of claim 12, further comprising:

determining the desired direction of travel and the quality of operation information based on road structure in which the vehicle is navigating.

18. A haptic feedback controller, comprising:
a plurality of haptic feedback actuators; and
processing circuitry configured to
- detect, via data received from one or more sensors, quality of operation information of a vehicle, threat information corresponding to the vehicle, and a mode of operation of the vehicle,
- determine, via the data received from the one or more sensors, a desired direction of travel of the vehicle based on the quality of operation information, the threat information, and the mode of operation, and
- provide haptic feedback corresponding to the quality of operation information, the threat information, the mode of operation, and the desired direction of travel of the vehicle via the plurality of haptic feedback actuators, wherein the haptic feedback includes a plurality of patterns having a plurality of parameters that correspond to a plurality of automated levels of the vehicle, a plurality of levels of threat intensity, and a plurality of levels of quality of operation information.

* * * * *